United States Patent
Tourapis et al.

(10) Patent No.: US 8,094,711 B2
(45) Date of Patent: Jan. 10, 2012

(54) ADAPTIVE REFERENCE PICTURE GENERATION

(75) Inventors: Alexandros Tourapis, West Windsor, NJ (US); Jill MacDonald Boyce, Manalapan, NJ (US)

(73) Assignee: Thomson Licensing, Boulogne Billancourt (FR)

( * ) Notice: Subject to any disclaimer, the term of this patent is extended or adjusted under 35 U.S.C. 154(b) by 1719 days.

(21) Appl. No.: 10/569,695

(22) PCT Filed: Sep. 2, 2004

(86) PCT No.: PCT/US2004/028650
§ 371 (c)(1),
(2), (4) Date: Feb. 27, 2006

(87) PCT Pub. No.: WO2005/034517
PCT Pub. Date: Apr. 14, 2005

(65) Prior Publication Data
US 2006/0291557 A1    Dec. 28, 2006

Related U.S. Application Data

(60) Provisional application No. 60/504,575, filed on Sep. 17, 2003.

(51) Int. Cl.
*H04N 11/02* (2006.01)
(52) U.S. Cl. .................................. 375/240.01
(58) Field of Classification Search .......... 375/240.01–240.03, 240.12, 240.13, 375/240.16, 240.26, 240.29; 348/723, 725
See application file for complete search history.

(56) References Cited

U.S. PATENT DOCUMENTS

| | | | | |
|---|---|---|---|---|
| 5,576,765 A | * | 11/1996 | Cheney et al. | 375/240.02 |
| 5,742,344 A | * | 4/1998 | Odaka et al. | 375/240.15 |
| 5,877,813 A | | 3/1999 | Lee et al. | |
| 5,995,154 A | * | 11/1999 | Heimburger | 348/448 |
| 6,005,626 A | | 12/1999 | Ding | |
| 6,067,125 A | | 5/2000 | May | |

(Continued)

FOREIGN PATENT DOCUMENTS

CN    1170318 A    1/1998

(Continued)

OTHER PUBLICATIONS

Christine Gomila, Alexander Kobilansky "SEI Message for Film Grain Encoding" JVT of ISO iEC MPEG and IUT-T VCEG JVT-H022, May 23, 2003, pp. 1-14, XP0023087842 Geneva, Switzerland abstract p. 2, paragraph 3.44715 ISSN: 1051-8215.

(Continued)

*Primary Examiner* — Tesfaldet Bocure
(74) *Attorney, Agent, or Firm* — Robert D. Shedd; Paul P. Kiel; Guy H. Eriksen

(57) ABSTRACT

A video encoder and corresponding method are provided for encoding an input picture or image block using a prediction from a reference-only picture, where the encoder includes a picture buffer for storing a previously coded picture, and a reference processing unit in signal communication with the picture buffer for generating the reference-only picture from a previously coded picture; and the corresponding method includes receiving a substantially uncompressed image block, filtering (714) a previously coded picture to create an adaptive reference, motion compensating the adaptive reference, subtracting the motion compensated adaptive reference from the substantially uncompressed image block, and encoding the difference between the substantially uncompressed image block and the motion compensated adaptive reference. Video decoder and corresponding method are also disclosed.

15 Claims, 5 Drawing Sheets

U.S. PATENT DOCUMENTS

| | | | |
|---|---|---|---|
| 6,452,579 B1* | 9/2002 | Itoh et al. | 345/100 |
| 6,650,708 B1* | 11/2003 | Ohgose | 375/240.16 |
| 6,748,020 B1* | 6/2004 | Eifrig et al. | 375/240.26 |
| 6,987,805 B1* | 1/2006 | Weckel et al. | 375/240 |
| 7,200,174 B2* | 4/2007 | Lainema et al. | 375/240.16 |
| 7,257,160 B2* | 8/2007 | Ju et al. | 375/240.12 |
| 7,760,803 B2* | 7/2010 | Schlockermann et al. | 375/240.12 |
| 2001/0055340 A1* | 12/2001 | Kim et al. | 375/240.21 |
| 2002/0037053 A1* | 3/2002 | Kim | 375/240.21 |
| 2002/0071487 A1* | 6/2002 | Kutka | 375/240.03 |
| 2002/0114388 A1* | 8/2002 | Ueda et al. | 375/240.01 |
| 2003/0142748 A1* | 7/2003 | Tourapis et al. | 375/240.13 |
| 2003/0152146 A1 | 8/2003 | Lin et al. | |
| 2003/0165197 A1* | 9/2003 | Greenfield et al. | 375/240.29 |
| 2004/0008783 A1* | 1/2004 | Boyce | 375/240.16 |
| 2004/0218668 A1* | 11/2004 | Hannuksela et al. | 375/240.01 |
| 2006/0133492 A1* | 6/2006 | Boyce | 375/240.16 |
| 2006/0193526 A1* | 8/2006 | Boyce et al. | 382/236 |
| 2010/0118940 A1* | 5/2010 | Yin et al. | 375/240.12 |

FOREIGN PATENT DOCUMENTS

| | | |
|---|---|---|
| EP | 0 817 497 A2 | 1/1998 |
| EP | 1 333 681 A2 | 8/2003 |
| EP | 1 335 609 A2 | 8/2003 |
| JP | 4-97681 | 3/1992 |
| JP | 8-79765 | 3/1996 |
| JP | 9-107549 | 4/1997 |
| JP | 0 817 497 | 1/1998 |
| JP | 10-66090 | 3/1998 |
| JP | 11-8855 | 1/1999 |
| JP | 2002-16928 | 1/2002 |
| JP | 0 758 186 | 11/2002 |
| JP | 2003-244704 | 8/2003 |

OTHER PUBLICATIONS

Llach J. Boyce J: "H. 264 encoder with low complexity noise pre-filtering" Proceedings of SPIE, Applications of Digital Image Processing XXVI, vol. 5203, Aug. 5, 2003, pp. 478-489, XP002311426 San Diego, USA abstract p. 480, paragraph 3.

Yuen M. et al.: "Performance of Loop Filters in MC/DPCM/DCT Video Coding" Signal Processing, 1996, 3rd International Conference on Beijing, China 14-187 Oct. 1996, New York, New York USA, IEEE, US. Oct. 14, 1996, pp. 1182-1186, XP010209397 ISBN: 0-7803-2912-0 abstract p. 1182, paragraph 1.-paragraph 2.

Kaup A.: Reduction of Ringing Noise in Transform Image Coding Using Simple Adaptive Filter: Electronics Letters, IEE Stevenage, GB, vol. 34, No. 22, Oct. 29, 1998, pp. 2110-2112 XP006010547 ISSN: 0013-5194.

Search Report dated Dec. 21, 2004.

* cited by examiner

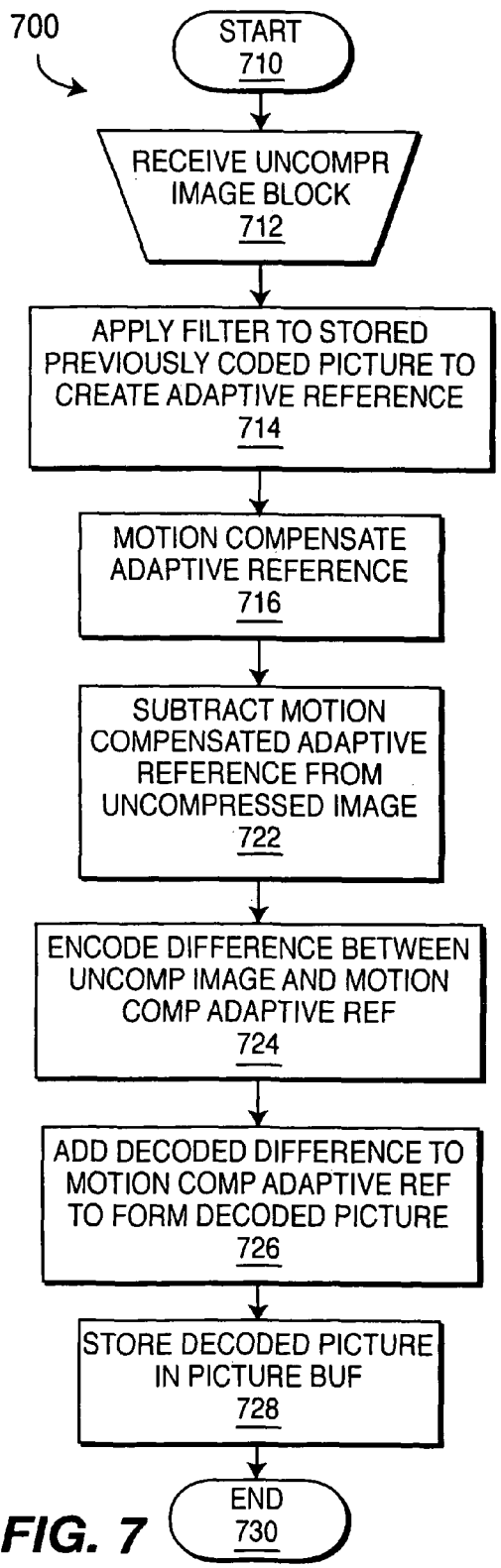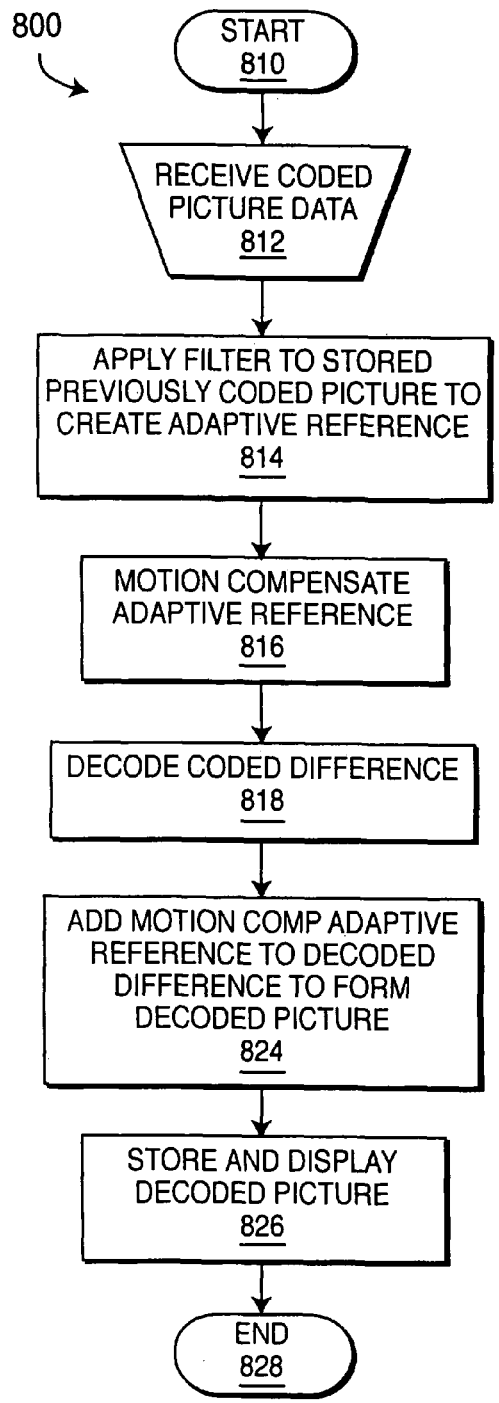
FIG. 7
FIG. 8

ADAPTIVE REFERENCE PICTURE GENERATION

CROSS-REFERENCE TO RELATED APPLICATION

This application claims the benefit, under 35 U.S.C. §365 of International Application PCT/US2004/028650, filed Sep. 2, 2004, which was published in accordance with PCT Article 21(2) on Apr. 14, 2005, in English and which claims the benefit of U.S. provisional patent application No. 60/504,575, filed Sep. 17, 2003.

FIELD OF THE INVENTION

The present invention is directed towards video encoders and decoders (CODECs), and more particularly towards the use of reference pictures as predictors in CODECS.

BACKGROUND OF THE INVENTION

In typical video compression systems and standards, such as MPEG-2 and JVT/H.264/MPEG AVC, encoders and decoders generally rely on intra and inter coding in order to achieve compression. In intra coding, spatial prediction methods are used; while for inter coding, compression is achieved by exploiting the temporal correlation that may exist between pictures. More specifically, previously encoded/decoded pictures are used as references for future pictures, while motion estimation and compensation are employed in order to compensate for any motion activity between these pictures. More advanced CODECs such as H.264 also consider lighting variations, such as during a fade in/out, in order to generate a more accurate prediction, when necessary. Finally, deblocking methods may also be used in an effort to reduce blocking artifacts created through the prediction and quantization processes.

Unfortunately, the typical methods related to inter coding fail to consider some additional properties and features that may considerably affect the entire prediction process. In particular, especially at higher resolutions, a picture may contain several types of noise, such as film grain or speckle noise. This kind of noise tends to be completely uncorrelated from one picture to the other, which would imply that any remaining noise within a reference picture would most likely need to be compensated during the encoding process. Although some of this noise may be removed through the quantization process and possibly through non-normative thresholding introduced in the encoder, it can still have a considerable negative impact in coding efficiency.

It is possible to remove this noise in a pre-processing stage, where temporal and spatial filtering methods can be used, thus allowing a considerable improvement in encoding efficiency; but it might also be desirable to retain, such as in the case of film content, some of this noise since it may itself be part of the artistic content of the film. Accordingly, what is needed is a new scheme to reduce uncorrelated noise in reference pictures while maintaining the artistic content of the displayed pictures.

SUMMARY OF THE INVENTION

These and other drawbacks and disadvantages of the prior art are addressed by an apparatus and method for video coding and decoding using adaptive reference regeneration.

The invention is a video encoder, decoder, and corresponding methods for encoding (and by corollary-decoding) a input picture or image block using a prediction from a reference-only picture. An exemplary encoder includes a picture buffer for storing a previously coded picture, and a reference processing unit in signal communication with the picture buffer for generating the reference-only picture from a previously coded picture. An exemplary encoding method includes receiving a substantially uncompressed image block, filtering a previously coded picture to create an adaptive reference, motion compensating the adaptive reference, subtracting the motion compensated adaptive reference from the substantially uncompressed image block, and encoding the difference between the substantially uncompressed image block and the motion compensated adaptive reference.

These and other aspects, features and advantages of the present invention will become apparent from the following description of exemplary embodiments, which is to be read in connection with the accompanying drawings.

BRIEF DESCRIPTION OF THE DRAWINGS

The present invention may be better understood with reference to the following exemplary figures, in which:

FIG. 7 shows a flow diagram for encoding with adaptive reference generation in accordance with principles of the present invention; and FIG. 8 shows a flow diagram for decoding with adaptive reference generation in accordance with principles of the present invention.

DETAILED DESCRIPTION OF PREFERRED EMBODIMENTS

Figure 1:
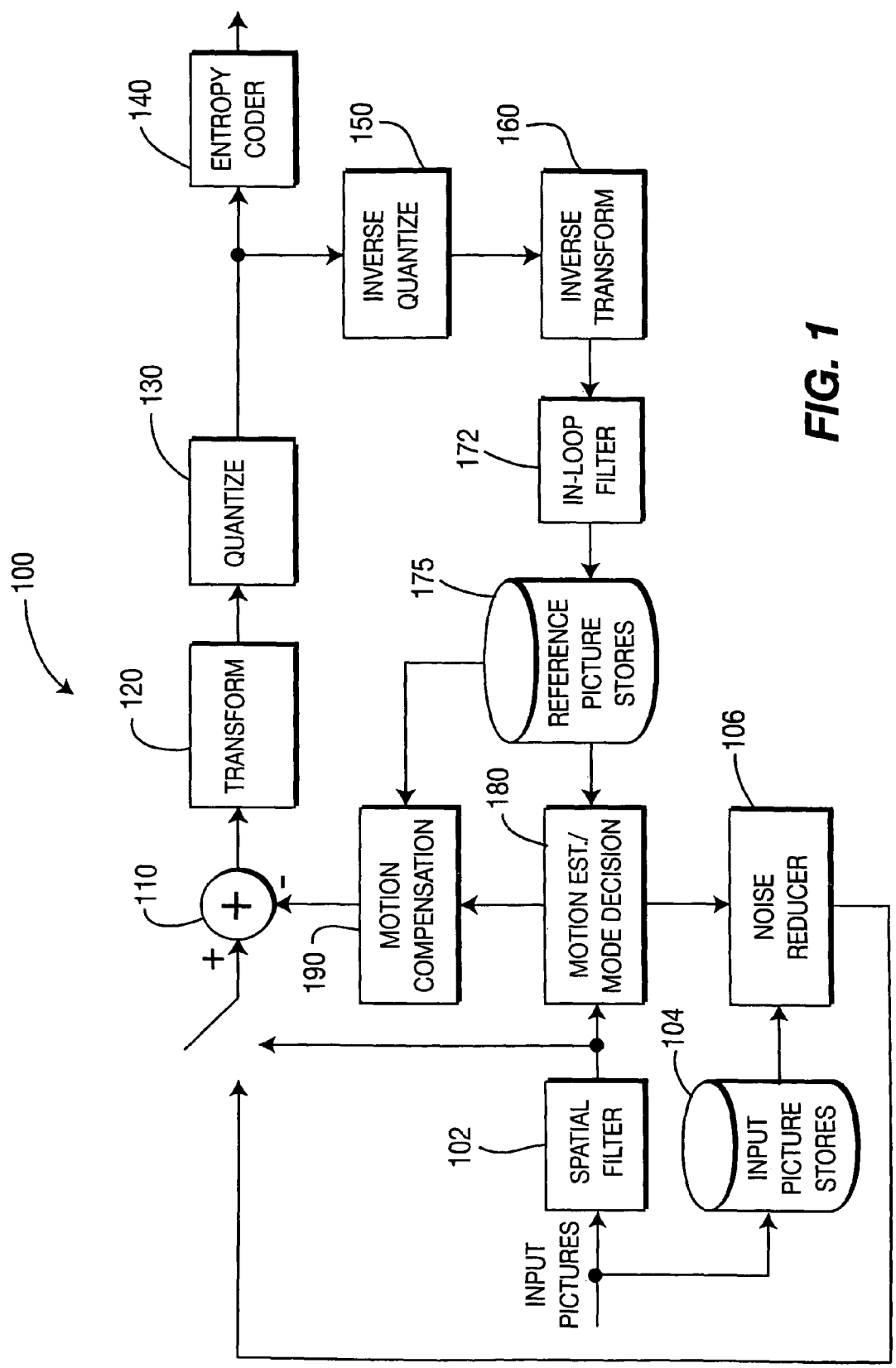
FIG. 1 shows a block diagram of a video encoder for adaptive reference regeneration according to an embodiment of the present invention.

In accordance with the principles of the present invention, a filter is applied to a previously coded picture before using it for reference when coding later pictures, thus allowing a further improvement in encoding efficiency. It can be used to retain noise information during the encoding process, when desired, to preserve the artistic content of display pictures.

The instant description illustrates the principles of several embodiments of the invention. It will thus be appreciated that those skilled in the art will be able to devise various arrangements that, although not explicitly described or shown as embodiments of the invention herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means that can provide those functionalities as equivalent to those shown herein.

As shown in FIG. 1, a video encoder is indicated generally by the reference numeral 100. An input to the encoder 100 is connected in signal communication with each of a spatial filter 102 and input picture stores 104. The output of the spatial filter 102 is switchably connected in signal communication with a first position of a switchable non-inverting input of a summing junction 110. The input picture stores 104 is connected in signal communication with a noise reducer 106, which is switchably connected in signal communication with a second position of the switchable non-inverting input of the summing junction 110. The output of the summing junction 110 is connected in signal communication with a block transformer 120. The transformer 120 is connected in signal communication with a quantizer 130. The output of the quantizer 130 is connected in signal communication with an entropy or variable length coder ("VLC") 140, where the output of the VLC 140 is an externally available output of the encoder 100.

The output of the quantizer 130 is further connected in signal communication with an inverse quantizer 150. The inverse quantizer 150 is connected in signal communication with an inverse block transformer 160, which, in turn, is connected in signal communication with an in-loop filter 172. The in-loop filter 172 is connected in signal communication with reference picture stores 175. A first output of the reference picture stores 175 is connected in signal communication with a first input of a motion estimator and mode decision unit 180. The output of the spatial filter 102 is further connected in signal communication with a second input of the motion estimator 180. A first output of the motion estimator 180 is connected in signal communication with a first input of a motion compensator 190. A second output of the motion estimator 180 is connected in signal communication with a second input of the noise reducer 106. A second output of the reference picture stores 175 is connected in signal communication with a second input of the motion compensator 190. The output of the motion compensator 190 is connected in signal communication with an inverting input of the summing junction 110.

Figure 2:
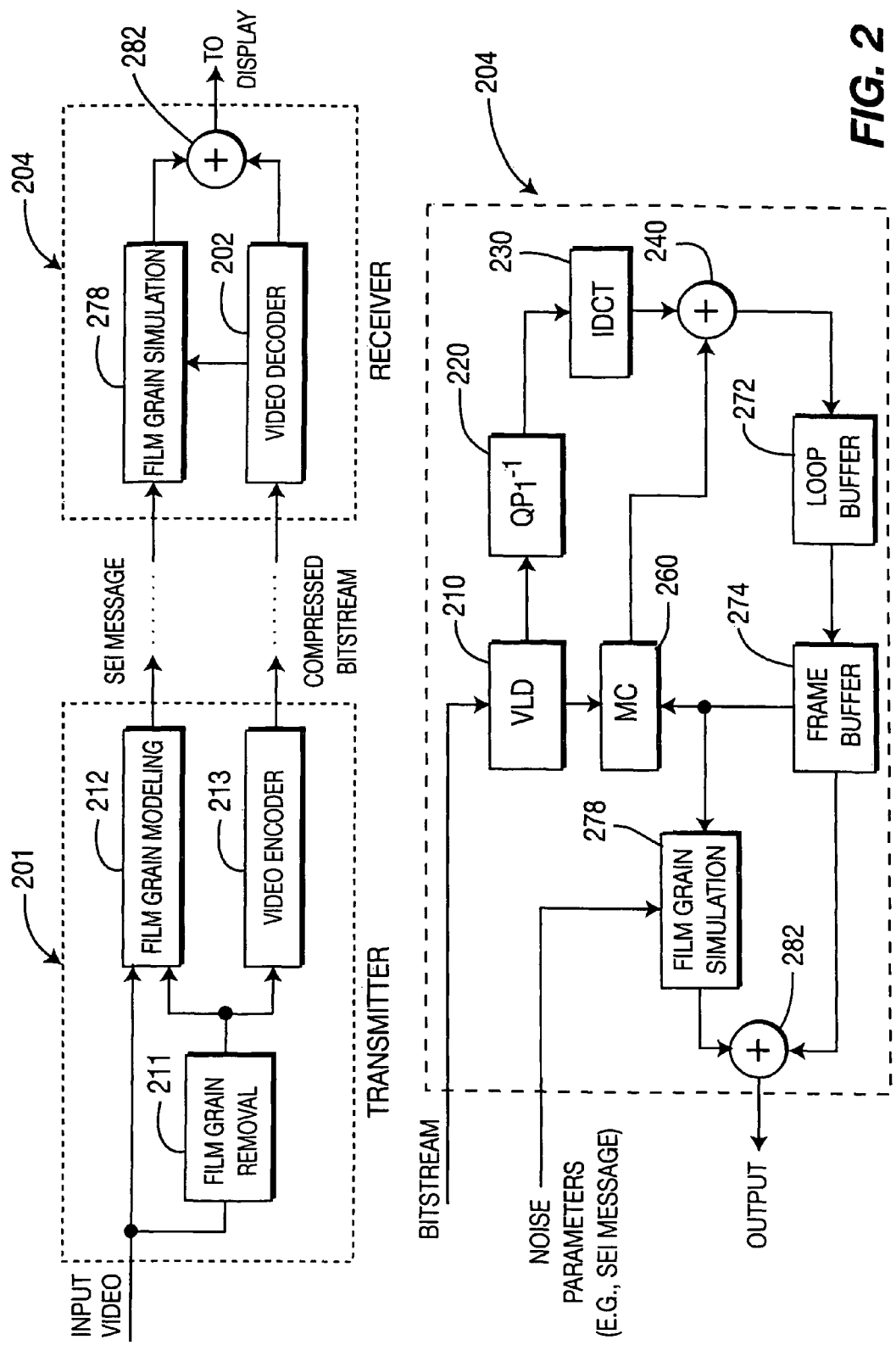
FIG. 2 shows a block diagram of a video decoder for adaptive reference regeneration according to an embodiment of the present invention.

Turning to FIG. 2, a transmitter 201 is in signal communication with a receiver 204. The transmitter 201 includes a film grain removal unit 211 and a film grain modeling unit 212, each for receiving an input video signal. The film grain removal unit 211 is in signal communication with each of the film grain modeling unit 212 and a video encoder 213. The video encoder 213 is in signal communication with a video decoder 202 of the receiver 204 for transmitting a compressed bitstream. The film grain modeling unit 212 is in signal communication with a film grain simulation unit 278 of the receiver 204 for transmitting a Supplemental Enhancement Information ("SEI") message. The video decoder 202 is in signal communication with each of the film grain simulation unit 278 and a first non-inverting input of a summing unit 282. The film grain simulation unit 278, in turn, is in signal communication with a second non-inverting input of the summing unit 282. The summing unit 282 provides a signal for display.

The receiver 204 includes a variable length decoder ("VLD") 210 for receiving a bitstream, connected in signal communication with an inverse quantizer 220. The inverse quantizer is connected with an inverse block transformer 230. The inverse transformer is connected in signal communication with a first input terminal of an adder or summing junction 240. The output of the summing junction 240 is connected in signal communication with a loop filter 272. The loop filter 272 is connected in signal communication with a frame buffer 274. The frame buffer 274 is connected in signal communication with each of a motion compensator 260, a film grain simulation unit 278, and a first non-inverting input of a summing junction 282. The VLD 210 output is also coupled as an second input to the motion compensator 260. The output of the motion compensator 260 is connected in signal communication with a second input terminal of the summing junction 240. The film grain simulation unit 278 has a second input for receiving noise parameters, such as an SEI message, for example. The output of the film grain simulation unit 278 is connected in signal communication with a second non-inverting input of the summing junction 282. The output of the summing junction 282 provides the output from the receiver 204.

Figure 3:
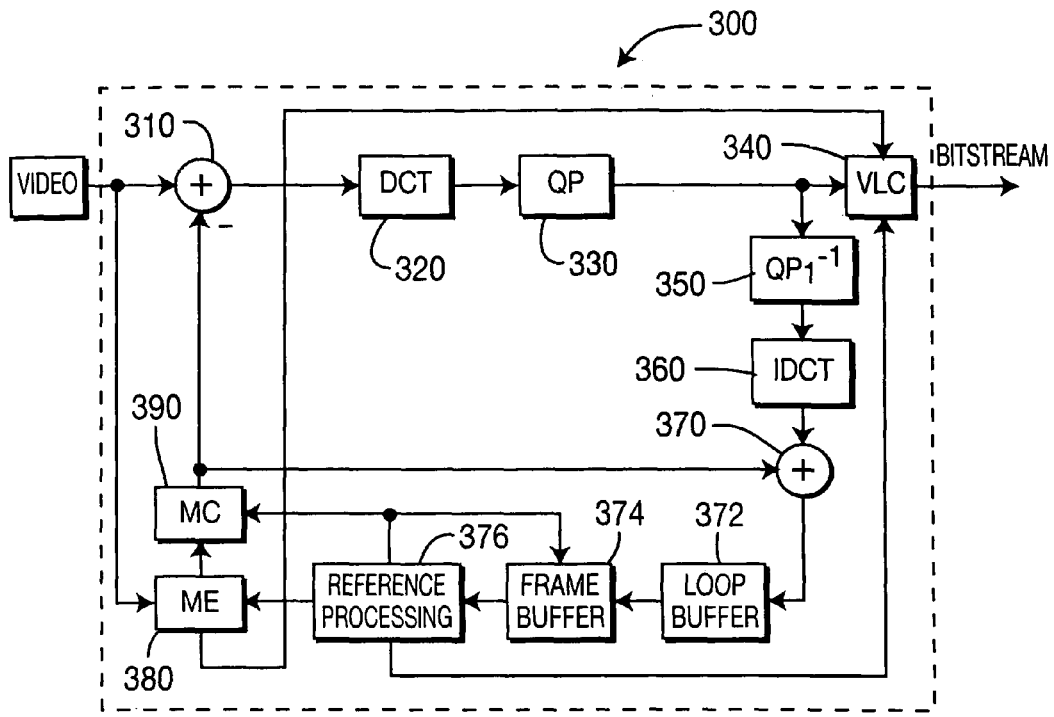
FIG. 3 shows a block diagram of a video encoder for adaptive reference regeneration according to another embodiment of the present invention.

Turning now to FIG. 3, a video encoder is indicated generally by the reference numeral 300. An input to the encoder 300 is connected in signal communication with a non-inverting input of a summing junction 310. The output of the summing junction 310 is connected in signal communication with a block transformer 320. The transformer 320 is connected in signal communication with a quantizer 330. The output of the quantizer 330 is connected in signal communication with a variable length coder ("VLC") 340, where the output of the VLC 340 is an externally available bitstream output of the encoder 300.

The output of the quantizer 330 is further connected in signal communication with an inverse quantizer 350. The inverse quantizer 350 is connected in signal communication with an inverse block transformer 360, which, in turn, is connected in signal communication with a first non-inverting input of a summing junction 370. The output of the summing junction 370 is connected in signal communication with a loop filter 372, and optionally connected in signal communication with a reference processing unit 376. The loop filter 372 is connected in signal communication with a frame buffer 374. The frame buffer 374 is connected in signal communication with the reference processing unit 376, and optionally connected in signal communication with a motion compensation unit 390. The reference processing unit 376 is connected in signal communication with each of the VLC 340, the frame buffer 374, a motion estimation unit 380, and the motion compensation unit 390.

The input to the encoder 300 is further connected in signal communication with a second input of the motion estimator 380. Outputs of the motion estimator 380 are connected in signal communication with a third input of the motion compensator 390, and a third input of the VLC 340. The output of the motion compensator 390 is connected in signal communication with an inverting input of the summing junction 310.

Figure 4:
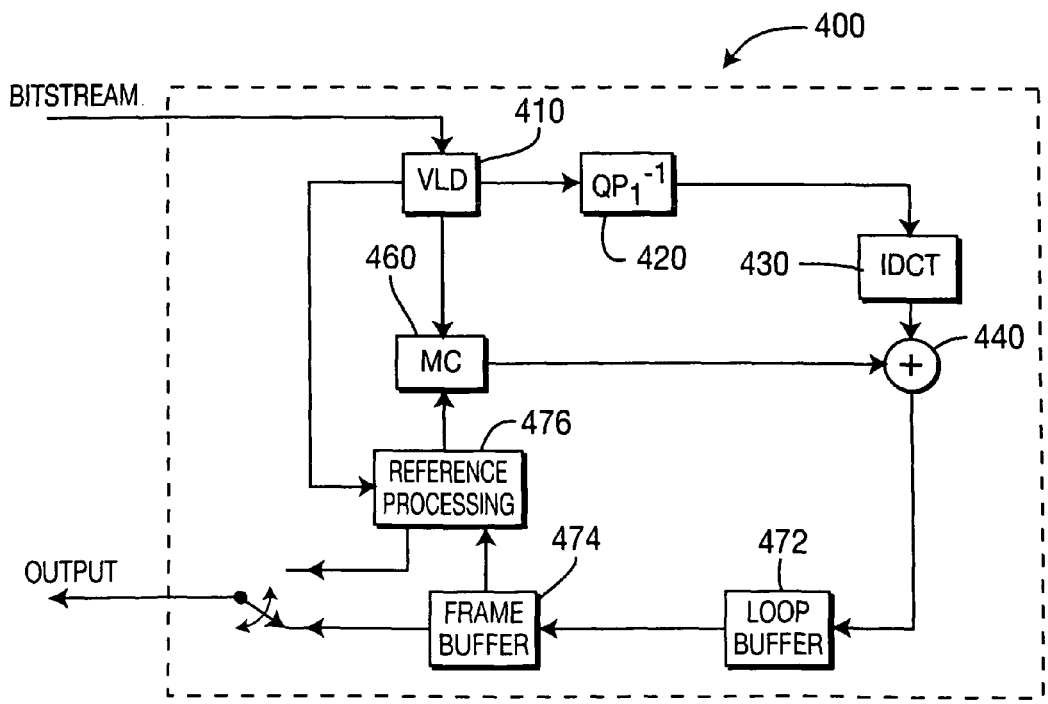
FIG. 4 shows a block diagram of a video decoder for adaptive reference regeneration according to another embodiment of the present invention.

As shown in FIG. 4, a video decoder is indicated generally by the reference numeral 400. The video decoder 400 includes a variable length decoder ("VLD") 410 for receiving a bitstream, connected in signal communication with an inverse quantizer 420. The inverse quantizer is connected with an inverse transformer 430. The inverse transformer 430 is connected in signal communication with a first input terminal of an adder or summing junction 440. The output of the summing junction 440 is connected in signal communication with a loop filter 472, (and optionally connected in signal communication with a reference processing unit 476 [not shown] instead of the loop filter 472, effectively bypassing the loop filter). The loop filter 472 is connected in signal communication with a frame buffer 474. A first output of the frame buffer 474 is connected in signal communication with a first input of the reference processing unit 476. The VLD 410 is connected in signal communication with a second input of the reference processing unit 476.

A first output of the reference processing unit 476 is connected in signal communication with a motion compensator 460, which is connected in signal communication with a second non-inverting input terminal of the summing junction 440, and optionally connected in signal communication with an input of the reference processing unit 476 [not shown]. An output of the video decoder 400 is switchably connected in signal communication with a second output of the frame buffer 474, and a second output of the reference processing unit 476, respectively.

Figure 5:
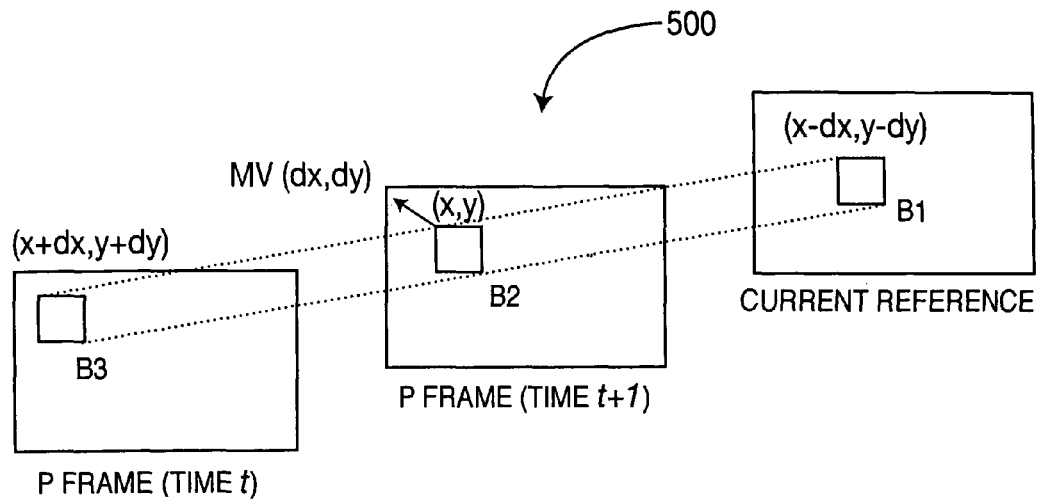
FIG. 5 shows a pictorial representation of reference generation by pixel projection according to an embodiment of the present invention.

Turning to FIG. 5, reference generation by pixel projection is indicated generally by the reference numeral 500, where each pixel is projected to a new position according to its previous motion vector.

Figure 6:
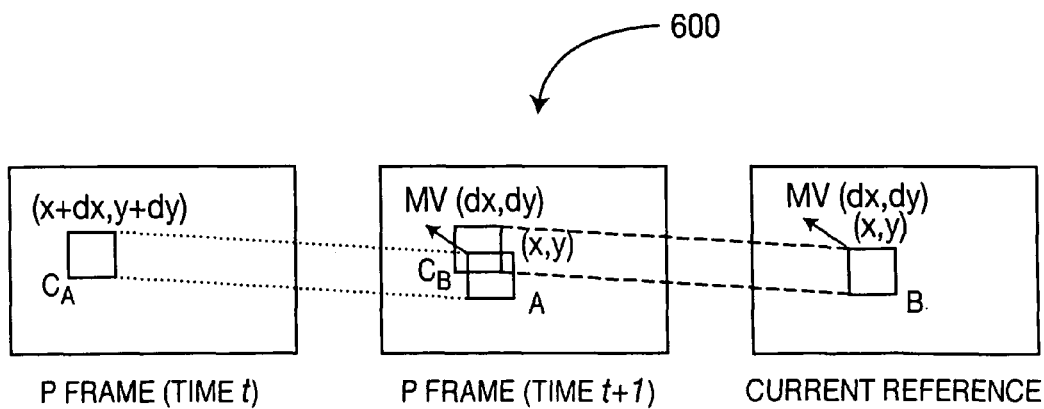
FIG. 6 shows a pictorial representation of reference generation by motion projection according to an embodiment of the present invention.

Turning now to FIG. 6, reference generation by motion projection is indicated generally by the reference numeral 600, where each block in the current reference is assumed to have the same MV as its co-located block.

As shown in FIG. 7, a process for encoding with adaptive reference generation in accordance with principles of the present invention is indicated generally by the reference numeral 700. The process includes a start block 710 that passes control to an input block 712. The input block 712 receives substantially uncompressed image block data, and passes control to a function block 714, which applies a filter to a stored previously coded picture to create an adaptive reference. The function block 714 passes control to a function block 718, which motion compensates the adaptive reference in correspondence with the motion vectors, and passes control to a function block 722. The function block 722 subtracts the motion compensated adaptive reference from the substantially uncompressed image block, and passes control to a function block 724. The function block 724, in turn, encodes a signal with the difference between the substantially uncompressed image block and the motion compensated adaptive reference, and passes control to a function block 726. The function block 726, in turn, adds a decoded difference to the motion compensated adaptive reference to form a decoded picture, and passes control to a function block 728. The function block 728 stores the decoded picture in a picture buffer, and passes control to an end block 730.

Turning to FIG. 8, a process for decoding with adaptive reference generation in accordance with principles of the present invention is indicated generally by the reference numeral 800. The process includes a start block 810 that passes control to an input block 812. The input block 812 receives coded picture data, and passes control to a function block 814. The function block 814 applies a filter to a stored previously coded picture to create an adaptive reference, and passes control to a function block 816. The function block 816 motion compensates the adaptive reference, and passes control to a function block 818. The function block 818, in turn, decodes the coded difference, and passes control to a function block 824. The function block 824 adds the motion compensated adaptive reference to the decoded difference to form a decoded picture, and passes control to a function block 826. The function block 826 stores and displays the decoded picture, and passes control to an end block 828.

Referring back to FIG. 1, video encoding and decoding architectures may consider pre-processing methods, such as spatial and/or temporal filtering, for example, in an attempt to remove noise from a video sequence. This process essentially improves the spatial and/or temporal relationships within the sequence, which leads to better encoding efficiency.

In some cases, as may be better understood with reference to FIG. 2, retaining some types of noise may be desirable (e.g., film grain noise within film type HD content). Thus, it is also desirable to associate such content with a set of encoded parameters that allow the decoder to generate an estimate of the original film grain noise. These parameters, for example, may be transmitted in H.264 with the use of SEI messages, while different models may be used for the generation of the noise.

Referring again to FIGS. 3 and 4, a new video encoding and decoding architecture is presented that can further improve performance versus existing methods. This is achieved by making a distinction between the encoded/decoded picture used for display and the associated picture that will be used as a reference for future coded pictures. In a particular example, depending on the content, one may already know or be able to predict with high accuracy the entire or part of the motion of a future picture, and thereby use this information to generate a more related reference picture. Furthermore, some types of noise, such as film grain noise, for example, are completely uncorrelated from picture to picture, and would need to be compensated and if possible completely removed from a reference picture in order to achieve better coding efficiency.

The presently disclosed architecture introduces an additional step within the encoding and decoding process where, using known spatial and temporal information that is available on both the encoder and decoder, embodiments can, if necessary, analyze and process a decoded picture and generate a new picture that can be used as a reference for a future picture. The decision and the entire reference generation procedure may be based on additional information encoded within the bitstream, or may be adaptively decided based on context. Furthermore, although not necessary, this new picture may also be used for display purposes, based on a bitstream signal or decoder decision.

In accordance with the principles of the present invention, an additional step within the encoding and decoding process is introduced for the generation of the inter prediction reference pictures that can lead to further improvement in coding efficiency compared to existing systems. A feature of the presently disclosed system is that for certain sequences such as noisy content, a previously decoded picture may not be the best possible reference since noise is usually not temporally correlated. Although noise can be removed in a pre-processing stage, it might be desirable that it be retained since it may itself be part of the actual content, as is sometimes the case for film-grain in film type content, for example.

In the present architecture, an additional optional filtering process may be applied to each reference picture using filters such as, for example, a median filter, Wiener filtering, Geometric Mean, Least Square, and the like, as well as combinations thereof. Filtering can additionally be used to handle and remove other types of noise that the sub-pixel interpolation does not remove. Linear filters may also be used, such as a simple averaging filter, for example, but without necessarily having to consider sub-pixel positions. It is also possible to consider temporal methods, such as temporal filtering, or even using the motion information of previous pictures to generate a new motion compensated reference, such as using global motion compensation, for example. For simplicity, these types of methods may be referred to as "filtering" or using a "filter" herein.

Although the filter and the process may be fixed for all references, several alternative architectures may be employed which may be more beneficial in different systems. In particular, a simple method would be to encode a signal for every picture, such as a 1 bit signal, for example, that specifies that if this picture is referenced by another picture, the filtered version will be used instead. In this case, it can be predefined on both encoder and decoder that the sub-pixel positions will be generated either by using the original samples or the filtered ones. Alternatively, an additional signal can be transmitted that specifies this operation.

Filter parameters and/or information may also be signaled within the stream for each picture. This method has the obvious benefit that no additional memory is required, but may also limit the encoder's flexibility since for some pictures a reference using a different filter, or none at all, would be more beneficial.

Instead, a more flexible solution would be to specify for each picture whether or not its references are filtered. This solution allows the encoder to better adapt to the characteristics of each picture and achieve higher performance. It is again possible to use the same filter for all references, or even allow different filters for each reference that may be signaled within the bitstream. One may also allow the same picture to be reused as a reference without any, or with different filtering options, considering that some areas of a picture might have different characteristics and may benefit from different filtering methods. For example, if one has N different pictures in a buffer that may be used as references for the current one, and K different filtering methods, including the originals, this would allow N×(K+1) different reference pictures that can be used as references. The filter would essentially be selected through the reference index associated to each reference at the macroblock level, somewhat similar to what is currently done for the explicit weighted prediction mode within H.264.

More specifically, the use and the parameters required by explicit weighted prediction are signaled within the picture and slice header during encoding. The picture header, for example, contains the parameters weighted_pred_flag and weighted_bipred_flag, which specify whether and which mode of weighted prediction is to be used. If weighted_pred_flag is 1, then for P and SP slices weighted prediction (always explicit) is used, while when weighted_bipred_flag is also 1, explicit weighted prediction is used for B pictures. If either of these parameters is set to 1 and the proper slice type is used, then the prediction weight table (pred_weight_table) elements are also transmitted within the slice header. These include weights and offsets for each reference picture in both list_0 and list_1 if the slice is a B picture and weighted_bipred_flag is equal to 1, which will be used during the generation of the prediction samples during motion compensation, depending on the reference that is associated with each block. The particular weight and offset to use for a particular reference picture is indicated by the reference picture index of a particular macroblock or macroblock partition.

Similarly, one can introduce additional elements that will signal the new prediction method and its parameters in the same headers. For example, one can define a new picture level syntax element named adaptive_ref_pred_flag. If this is equal to 1, an additional table is transmitted within the slice header (e.g. adaptive_ref_table) that will contain additional parameters for each reference picture in either list, which can include filtering methods and filter parameters. The filter parameters can be dynamic and depend on the filtering method to be used. For example, no additional parameters are necessary for a median filter, while for a separable filter one may need the number of taps and the coefficients. The reference picture index may be used to select a particular filter for a particular macroblock or macroblock partition.

The above method would imply additional computation and storage on the encoder and decoder, although it might be possible to compute the filtered values on the fly and reduce the storage requirements. In addition, calculating the sub-pixel values for each one of these references is not always necessary, and only the sub-pixel values generated from the original might be calculated and stored thereby further reducing the complexity of such an encoder. In this case, one can either allow the sub-pixel values of the filtered references to be identical to those of the original, which may still be beneficial under a Rate Distortion Optimization model, or only allow integer motion vectors for filtered reference pictures. In such a case, these motion vectors need to be properly scaled during the motion vector prediction process, while their predictors should be rounded to their closest integer values.

Apart from signaling whether and which filter would be used for generating a reference, it is also possible to make such a decision at the macroblock level given some characteristics of the decoded macroblock or mode. For example, some modes such as SKIP for P pictures or Direct or Bi-predictive for B pictures appear in most sequences to benefit from non-filtered pictures. If SKIP is used, for example, this implies that the current macroblock has very high similarity with its reference; and that even if some noise exists, this would not affect visual quality significantly. The same applies to Direct SKIP, while all bi-predictive modes, including Direct, work themselves as a temporal filter that can also reduce a lot of the noise. On the other hand, if a filtered picture is used for these modes, it is possible that the additional filtering may introduce more artifacts, such as blurring, that may reduce efficiency.

As discussed, FIGS. 3 and 4 show an encoder and decoder, respectively. A unique element included in the encoder and decoder is the Reference Processing module. From FIG. 3, it is possible to select to process and generate a reference from a picture after or before the deblocking process, while filtering is not mandatory. Motion information from previously encoded pictures may also be used to generate a motion-projected reference. This reference may be generated by considering that, similar to temporal direct used within H.264, motion remains relatively continuous from one adjacent picture to another. Using this observation, the reference may be generated by using pixel projection, where each pixel is projected to a new position according to its previous motion vector, as shown in FIG. 5; or by using motion projection, where each macroblock in the current reference is assumed to have the same MV as its co-located block, as shown in FIG. 6. Both methods may also be combined using a weighted average, while the pixels projected may be also be filtered using other methods. As an extension, one may also use a similar method, as in multispectral image enhancement, where multiple pictures are combined, such as through motion/pixel projection or filtering, to generate a single reference, comparable to super-resolution imaging or salient stills.

Exemplary filters include: a) 1×3, b) 3×1, c) the separable (first 1×3 followed by 3×1), and d) 3×3 median, f) their weighted averages with the original references (i.e. ref=(a×$Med_{1\times3}$+b×$Med_{3\times1}$+c×$Med_{3\times3}$+d×original+(a+b+c+d)/2)/(a+b+c+d)), g) wiener filtering (due to its handling of Gaussian noise), h) a 3×3 averaging filter with coefficients:

$$A = \begin{bmatrix} 1 & 2 & 1 \\ 2 & 4 & 2 \\ 1 & 2 & 1 \end{bmatrix},$$

or i) a simple separable n-tap filter, j) the thresholded average (use filter h only if result is considerably different than original sample), and combinations of these filters. Other filters may also be used and may be signaled in the bitstream or be known in both the encoder and decoder, and selected through parameters within the bitstream, such as through the reference index, for example.

A rather interesting filter with relatively low complexity that was also used in this architecture, and which preserves edges better than the simple 3×3 Median, was the combination of the median with a 2-D order-statistic filter. The current pixel and its 8 surrounding pixels within the original picture were selected and then sorted. If the current pixel was the same as the 3×3 median, no other operation was performed. If not, and if the current pixel was either the largest or smallest sample, then this was replaced with its closest sample, or in a different implementation the average between its closest sample and itself. Otherwise, this sample was replaced with the average of the value of the current and its two closest samples.

The decoder must know exactly which filter was used in order to generate an identical reference and avoid drift. This filter may be known, and identical on both encoder and decoder, while it is also possible to transmit this filter at the picture or slice level. Although transmitting the entire filter at the MB level would imply a considerable overhead, it might nevertheless be possible to transmit some additional parameters that may adjust part of the filter, such as an additional MV scaling parameter if the filter is using a global motion compensated reference, and allow extra flexibility. On the other hand, the encoder needs to be able to select the proper processing method with minimal complexity. For this purpose, pre-analysis methods of the reference and the current picture may be used, such as noise estimation, image correlation, and the like. These estimates may be done at either the entire picture level, or even at different regions, particularly when considering that different areas may have different characteristics that may be detected more accurately with a region based method.

These and other features and advantages of the present invention may be readily ascertained by one of ordinary skill in the pertinent art based on the teachings herein. It is to be understood that the principles of the present invention may be implemented in various forms of hardware, software, firmware, special purpose processors, or combinations thereof.

Most preferably, the principles of the present invention are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

The invention claimed is:

1. A method for encoding video signal data for an image block, the method comprising:
   receiving a substantially uncompressed image block;
   filtering a previously coded picture to create an adaptive reference;
   motion compensating the adaptive reference;
   determining a difference between the motion compensated adaptive reference and the substantially uncompressed image block; and encoding the difference between the substantially uncompressed image block and the motion compensated adaptive reference.

2. A method as defined in claim 1, further comprising:
decoding the encoded difference;
adding the decoded difference to the motion compensated adaptive reference to form a decoded picture; and
storing the decoded picture in a picture buffer.

3. A method as defined in claim 1 wherein filtering is responsive to a bitstream field for signaling which of a plurality of filters to apply for reducing uncorrelated noise.

4. A method as defined in claim 3 wherein signaling of a filter to apply comprises specifying for each picture whether its references are filtered.

5. A method as defined in claim 3 wherein signaling of a filter to apply comprises specifying whether to use the same filter for all references.

6. A method as defined in claim 3 wherein signaling of a filter to apply comprises specifying whether to reuse a reference with different filtering parameters.

7. A method as defined in claim 3 wherein a signaled filter to apply for one reference is different from a signaled filter to apply for another reference.

8. A method for decoding video signal data for a display picture, the method comprising:
receiving a reference-only picture;
receiving uncorrelated picture data;
motion compensating the reference-only picture;
reconstituting the motion compensated reference picture with the uncorrelated picture data; and
providing the reconstituted picture as a decoded output,
wherein the uncorrelated picture data is indicative of film grain content.

9. An apparatus for encoding video signal data for an image block comprising:
a filter used for filtering a previously coded picture to create an adaptive reference;
a motion compensator in signal communication with the filter for motion compensating the adaptive reference;
a comparator for determining a difference between the motion compensated adaptive reference and the image block; and
encoding the difference between the image block and the motion compensated adaptive reference.

10. An apparatus as defined in claim 9 wherein the filtering is performed responsive to a field for signaling which of a plurality of filters to apply for reducing uncorrelated noise.

11. An apparatus as defined in claim 10 wherein a signaled filter to apply for one reference is different from a signaled filter to apply for another reference.

12. An apparatus as defined in claim 10 wherein signaling of a filter to apply comprises specifying for each picture whether its references are filtered.

13. An apparatus as defined in claim 10 wherein signaling of a filter to apply comprises specifying whether to use the same filter for all references.

14. An apparatus as defined in claim 10 wherein signaling of a filter to apply comprises specifying whether to reuse a reference with different filtering parameters.

15. An apparatus for decoding video signal data for a display picture comprising:
a motion compensator for motion compensating a received reference picture; and
means for reconstituting the motion compensated reference picture with received uncorrelated picture data to provide a decoded output of the reconstituted picture,
wherein the uncorrelated picture data is indicative of film grain content.

\* \* \* \* \*